FIG. 3 — EXHAUST — 28 LOW SPEED — INTAKE

INVENTOR.
HENRY A. ROAN
BY
ATTORNEYS

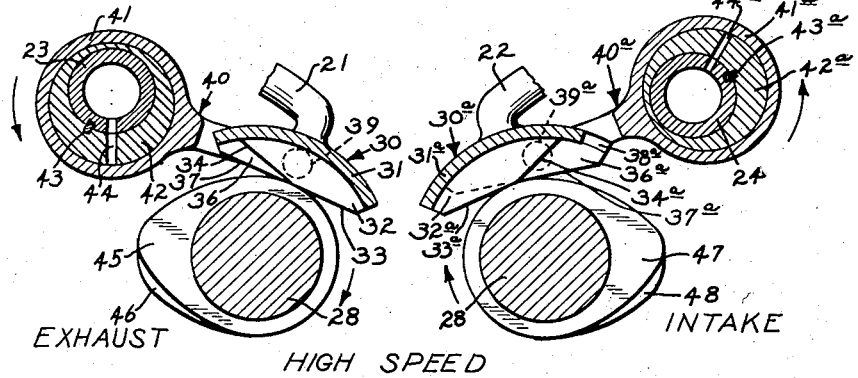

United States Patent Office 2,880,712
Patented Apr. 7, 1959

2,880,712

VARIABLE VALVE TIMING FOR OVERHEAD CAM ENGINES

Henry A. Roan, Minneapolis, Minn.

Application July 3, 1958, Serial No. 746,519

7 Claims. (Cl. 123—90)

My invention relates generally to improvements in variable valve timing mechanism for engines of the overhead valve type wherein the valves are mounted in the cylinder head of an engine, and more particularly to variable valve timing mechanism for such engines wherein the valve operating cam shaft is also disposed adjacent or over the cylinder head.

It has been long recognized by those skilled in the internal combustion engine art, that overhead cams are the most efficient means for operating overhead valves due to simplification of the linkage between the cams on an overhead cam shaft and the valves operated thereby, and the substantial reduction of lost motion as well as a reduction in friction losses. It is further well known that valve timing is important to the highest running efficiency of an internal combustion engine, and that valve timing thus suited for high engine speed is not the best timing for low engine speed.

An important object of my invention is the provision of variable valve timing mechanism for internal combustion engines of the overhead cam variety which is operative to vary the valve timing during operation of an engine to give maximum efficiency over the entire operating speed range of the engine.

Another object of my invention is the provision of a novel valve actuating rocker arm for overhead cam engines, having fixed and movable cam-engaging portions, and novel means for shifting the movable portion to vary the time of opening and closing of the valve associated with the rocker arm.

Another object of my invention is the provision of a valve actuating rocker arm having a non-adjustable surface portion for engagement with an overhead rotary cam, a shiftable cam-engaging element mounted on the rocker arm adjacent said non-adjustable portion, control means including a control shaft for shifting said adjustable cam-engaging element, and novel means for supporting the rocker arm and control shaft in co-axial relationship.

Another object of my invention is the provision of variable valve timing mechanism as set forth which can be quickly and easily installed on overhead cam and valve engines, and which require a minimum of adjustment and attention in operation. The above, and still further highly important objects and advantages of my invention, will become apparent from the following detailed specification, appended claims and attached drawings.

Referring to the drawings, which illustrate the invention, and in which like reference characters indicate like parts throughout the several views:

Fig. 3 is a fragmentary section taken substantially on the line 3—3 of Figure 2;

Fig. 6 is a view corresponding to Fig. 3 but showing a different position of some of the parts;

Fig. 7 is a view corresponding to Fig. 4 but showing a different position of some of the parts.

Fig. 8 is a view partly in section and partly in elevation, taken substantially on the line 8—8 of Fig. 2;

Fig. 9 is a fragmentary view in perspective of the cam-engaging end of one of the rocker arms of my invention, and cam-engaging portions associated therewith;

Fig. 10 is a view corresponding to Fig. 9 with some parts removed; and

Figs. 11, 12 and 13 are diagrams showing the valve timing obtained by my invention, at high, medium and low engine speeds respectively.

Figure 1:
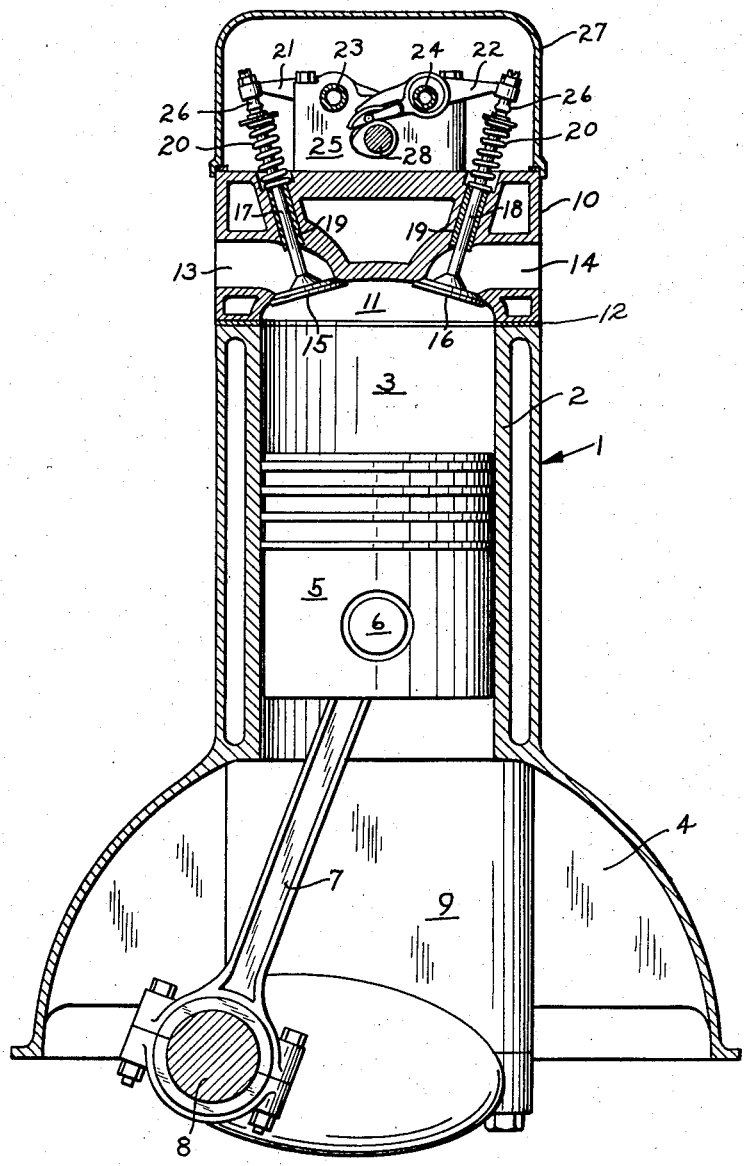
Figure 1 is a fragmentary view in section of a portion of a conventional internal combustion engine of the overhead valve and overhead cam type, showing my invention installed in the valve train of one of the valves thereof.

Referring with greater detail to the drawings, the numeral 1 indicates, in its entirety, an internal combustion engine comprising a cylinder block 2 defining a cylinder 3 and a crank case, indicated generally at 4. A piston 5 is mounted for reciprocatory movement in the cylinders 3 and as provided with the usual wrist pin 6 to which is mounted in the conventional manner, the upper end of a connecting rod 7 that is journalled at its lower end to a crank shaft 8 mounted in the crank case 4 by means of a bearing bracket 9.

A cylinder head 10 is secured to the upper end of the block 2 by the usual means not shown, and cooperates with the upper end portion of the cylinder block 2 to define a combustion chamber 11, the cylinder head 10 being sealed to the top of the cylinder block 2 by means of the usual head gasket 12.

The cylinder head 10 is formed with the usual exhaust and inlet ports 13 and 14 respectively that are normally closed by exhaust and intake valves 15 and 16 respectively. Said valves 15 and 16 are provided with respective valve stems 17 and 18 that are axially movable in tubular valve guides 19 mounted in the cylinder head 10, the valve stems 17 and 18 extending above the top of the cylinder head 10. Coil compression springs 20 encompass the upper end portions of the valve stems 17 and 18 and yieldingly urge the valves 15 and 16 toward their closed positions, in the usual manner.

Figure 2:
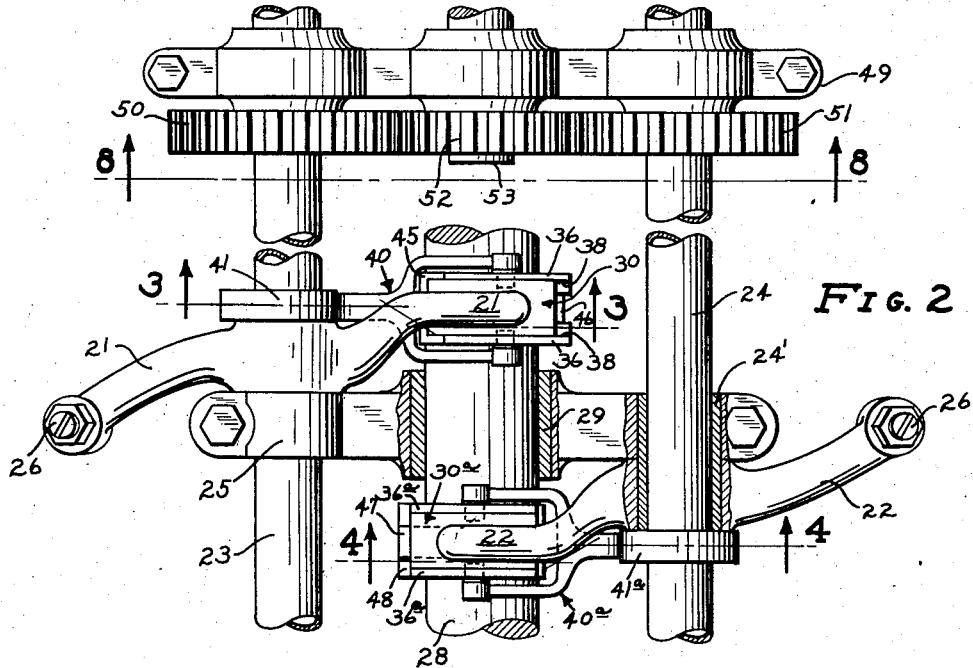
Fig. 2 is an enlarged fragmentary view in plan of the overhead cam shaft, a pair of valve-operating rocker arms and supporting means therefor, of Fig. 1, some parts being broken away and some parts being shown in section.

A pair of rocker arms 21 and 22 are utilized to open the exhaust and intake valves 15 and 16 respectively, against bias of their respective springs 20, and are journaled co-axially with respective control shafts 23 and 24 adjacent mounting brackets 25, one of which is shown. As illustrated in Figure 2, the rocker arm 22 is journaled intermediate its ends on a tubular bearing 24' that is rigidly secured in the bearing bracket 25, the adjacent control shaft 24 being journaled within the tubular bearing 24'. The rocker arm 21 and control shaft 23 are likewise journaled with respect to the bracket 25 in laterally spaced parallel relation to the control shaft 24. The outer ends of the rocker arms 21 and 22 are provided with lock nut-equipped headed screws 26 which engage the upper ends of the valve stems 17 and 18 of the exhaust and intake valves 15 and 16 respectively, the top of the cylinder head 10 being enclosed by the usual cover element 27. An overhead cam shaft 28 is journaled in aligned bearings 29, one of which is shown, the bearings being mounted in the brackets 25, the cam shaft 28 being parallel to the control shafts 23 and 24 and disposed between said control shafts and somewhat below the level thereof, see particularly Fig. 1.

The inner ends of the rocker arms 21 and 22 are formed to provide enlarged bodies or feet 30 and 30a respectively, said feet defining respective opposed arcuate flanges 31 and 31a, which flanges are beveled at their outer edges. The feet 30 and 30a each further define relatively fixed or non-adjustable portions 32 and 32a respectively, each having flat cam-engaging surfaces 33 and 33a respectively, which face generally downwardly toward the cam shaft 28. Further, the non-adjustable portions 32 and 32a defined other generally downwardly directed flat cam-engaging surfaces 34 and 34a respectively, these latter surfaces being angularly disposed relative to their respective cam-engaging surfaces 33 and 33a, see particularly Figs. 3, 4, 6 and 7. The flanges 31 and 31a define downwardly facing arcuate guide surfaces 35 and 35a respectively and provide arcuate guide means for cooperating pairs of movable cam-engaging elements in the nature of segmental shoes 36 and 36a respectively. The shoes 36 and 36a define flat cam-engaging surfaces 37 and 37a respectively and undercut cross sectionally beveled slots 38 and 38a respectively that receive and slidably interlock with the beveled edges of the arcuate flanges 31 and 31a respectively. The cooperating pairs of shoes 36 and 36a are provided with opposed recesses, and are maintained in transversely aligned relation on their respective opposed flanges 31 and 31a by aligned pivot pins 39 and 39a respectively on the inner ends of yoke-like control arms 40 and 40a respectively, the pivot pins being received in said recesses. At their outer ends, the control arms 40 and 40a are formed to provide circular heads 41 and 41a respectively which encompass respective ones of the control shafts 23 and 24 and which are journaled on eccentric bushings 42 and 42a respectively that are keyed to their respective control shafts 23 and 24 as indicated at 43 and 43a respectively. It will be noted that the control shafts 23 and 24 are tubular and that the same cooperate with their respective eccentric bushings 42 and 42a to define generally radial passages 44 and 44a so that, if desired, lubricant may be introduced to the interior of the control shafts 23 and 24 and flow from thence through the passages 44 and 44a to lubricate the control arm heads 41 and 41a.

Closely adjacent one end of the bearing 29, the cam shaft 28 is formed to provide a cam 45 which, upon rotation of the cam shaft 28, engages the cam-engaging surfaces 37 of the shoes 31 to move the rocker arm 21 in a direction to open the valve 15 against yielding bias of its cooperating spring 20. The cam 45 is provided with a narrow lobe 46 that is adapted to engage only the surfaces 33 and 34 of the foot 30. Closely adjacent the opposite end of the bearing 29, the cam shaft 28 is formed to provide a second cam 47 which, upon rotation of the cam shaft 28, engages the surface 33a and 37a of the foot 30a and shoes 36a to move the rocker arm 22 in a direction to open the intake valve 16 against bias of its spring 20. The cam 47 is formed to provide a lobe 48 which is sufficiently narrow so that it engages only the valve engaging surface 33a of the foot 30a. With reference to Figs. 3, 4, 6 and 7, it will be seen that the relatively narrow lobe 46 is in a trailing position on its respective cam 45, whereas the relatively narrow lobe 48 is in a leading position on its respective intake cam 47, for a purpose which will hereinafter be more fully described.

The tubular control shafts 23 and 24 are journaled in a bearing bracket 49 suitably located on the engine 1, and have keyed or otherwise rigidly mounted thereof respective toothed gears 50 and 51, see Figs. 2 and 8. The gears 50 and 51 have meshing engagement with an intermediate pinion 52 that is keyed or otherwise rigidly secured on a primary control shaft 53 also journaled in the bearing bracket 49 in spaced parallel relation to the control shafts 23 and 24. The primary control shaft 53 may be assumed to be driven by a conventional governor or any suitable means, not shown. The primary control shaft 53 is adapted to be rotated in opposite directions to cause shifting movements to be imparted to the shoes 36 and 36a on the seat of their respective rocker arms 21 and 22, in opposite directions.

Figure 4:
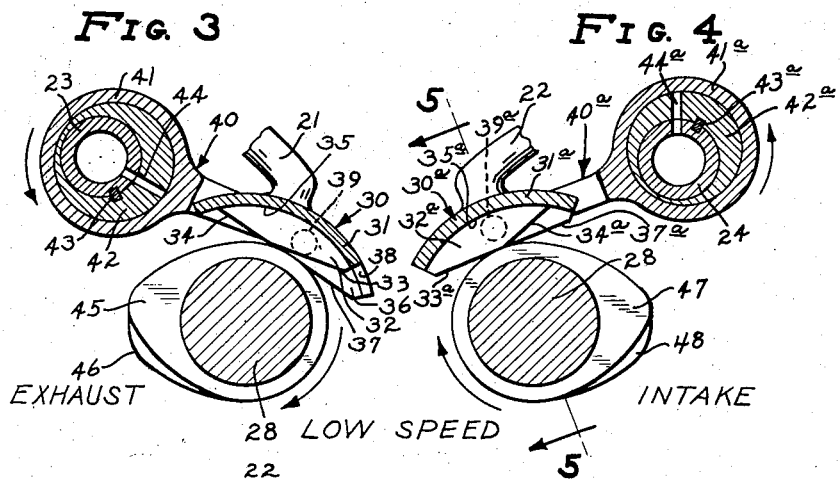
Fig. 4 is a transverse section taken substantially on the line 4—4 of Fig. 2.
Figure 5:
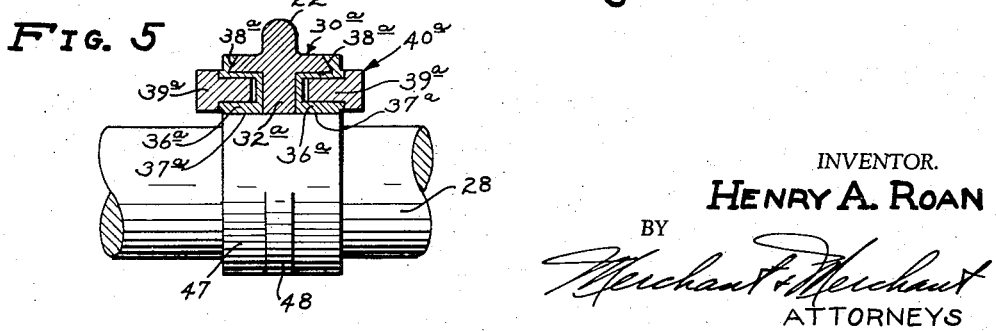
Fig. 5 is a fragmentary detail partly in section and partly in side elevation, taken substantially on the line 5—5 of Fig. 4.

The tubular control shafts 23 and 24 are so coupled together through the gears 50—52, and the eccentric bushings 42 and 42a are so mounted on the control shafts 23 and 24 respectively, that at low engine speeds, the shoes 36 and 36a are disposed on their respective rocker arm seats 30 and 30a as shown in Figs. 3 and 4. As there shown, the valve engaging surfaces 33a and 37a associated with the intake cam 47, are disposed in a common plane, and the cam-engaging surfaces 33 and 37 associated with the exhaust cam 45 are angularly disposed relative to each other. With the cam-engaging surfaces thus disposed, the valve timing of the engine 1 is that which is shown in Fig. 13, wherein the intake valve opens at 20° before top dead center and closes 30° beyond bottom dead center, the exhaust valve opening 30° before bottom dead center and closing 15° beyond top dead center. When the shoes 36 and 36a are moved to their positions of Figs. 6 and 7, on their respective feet 30 and 30a, during high engine speeds, the valve timing is that illustrated in Fig. 11. Here it will be noted that the intake valve opens at 20° before top dead center and closes at 65° beyond bottom dead center, the exhaust valve opening 60° before bottom dead center and closing 15° beyond top dead center. Here it will be noted that an intermediate position of the shoes 36 and 36a between the positions shown in Figs. 3, 4, 6 and 7 results in a valve timing illustrated in Fig. 12. It will be further noted that shifting of the shoes 36 and 36a on their respective rocker arm feet 30 and 30a changes only the timing of closing of the intake valve and opening of the exhaust valve, the time of opening of the intake valve and the closing of the exhaust valve being constant throughout the operating speed range of the engine. This is due to the narrow cam lobes 46 and 48 which engage only the non-adjustable surfaces 33, 34, 33a and 34a of their respective rocker arms 21 and 22. With the above described variable valve timing, at low engine speeds, the intake valve closes earlier than at high engine speeds to effectively lengthen the compression stroke of the piston, thus obtaining a substantial increase in compression and engine efficiency. Likewise, opening of the exhaust valve at low engine speeds later than at high engine speeds also results in a longer power stroke of the piston at low engine speeds, and consequently greater engine power with the same amount of fuel. By retarding the closing of the intake valve and advancing opening of the exhaust valve as the speed of the engine increases, an optimum of operating efficiency is obtained throughout the entire speed range of the engine.

It will be appreciated that the arcuate surfaces 35 and 35a of their respective feet 30 and 30a are so disposed relative to the cam shaft 28 that the shoes 36 and 36a are adjustably movable in arcuate paths substantially about the axis of the cam shaft 28, and that frictional engagement between the cams 45 and 47 and their respective cam-engaging elements or surfaces tends to urge the adjustable cam-engaging elements 36 and 36a in the direction of rotation of the cam shaft 28. The arrangement of the eccentric bushings 42 and 42a on their respective control shafts 23 and 24 is such, that this frictional engagement of the cams with their respective cam-engaging elements tends to rotate the control shafts 23 and 24 in opposite directions. Inasmuch as the gear connection 52 between the gears 50 and 51 forces said gears 50 and 51 to rotate in the same direction, the frictional load imposed by the cams 45 and 47 upon their respective cam-engaging elements is equalized through the gears 50—52, so that turning force of the primary control shaft 53 required to move the shoes 36 and 36a, is equal in either direction of rotation of the shaft 53. Further, the above-described arrangement of overhead cam with cooperating adjustable cam-engaging elements mounted on cam-engaging rocker arms which are also directly coupled to the intake and exhaust valves, provides for highly accurate valve movements with a minimum of lost motion between the cams and their respective valves. Moreover, my improved variable valve timing mechanism may be readily installed on present day overhead cam engines without the necessity for modifying the engine block and with a minimum of modification of the cylinder head portion thereof, it being only necessary to provide the cylinder head with the particular type of supports necessary for the control shafts 23 and 24 and the primary control shaft 53. As shown, my novel valve timing apparatus lends itself well to the type of engines shown wherein the intake and exhaust ports communicate with opposite sides of the engine for better scavaging of exhaust gases and for simplicity of manifold design.

While I have shown and described my improved variable valve timing mechanism in connection with a single cylinder engine, it will be appreciated that the same is as readily applicable to multi cylinder engines, there being a pair of valves 15 and 16 for each cylinder and a duplicate pair of rocker arms 21 and 22 and parts carried thereby, as well as cams 45 and 47 for the valves of each cylinder, the cams for each cylinder being angularly disposed with respect to each other in the usual manner.

While I have shown and described a commercial embodiment of my novel variable valve timing mechanism, it will be understood that the same is capable of modification, and that modification may be made without departure from the spirit and scope of the invention, as defined in the claims.

What I claim is:

1. In an internal combustion engine, of the type involving a cylinder block having a piston mounted for reciprocatory movements therein and a cylinder head cooperating with said block to define walls of a combustion chamber, a valve in said cylinder head, a cam rotatively mounted adjacent said cylinder head, and valve actuating connections between said cam and valve, said valve actuating connections comprising, a rocker arm having a portion engaging said valve, said rocker arm having a non-adjustable surface portion engaging said cam and an arcuate guide surface adjacent said cam-engaging surface, an adjustable cam-engaging element having a cam-engaging surface portion and arcuate guide means in sliding engagement with said arcuate guide surface on the rocker arm, support means on said cylinder head mounting said rocker arm for cam-imparted rocking movements in directions toward and away from said valve and cam, and means for moving said cam-engaging element in an arcuate path on said arcuate guide surface to shift the cam-engaging surface of said element angularly with respect to said non-adjustable surface and substantially about the axis of rotation of said cam, said cam having a portion engaging both said surfaces and a second portion for engagement with only said non-adjustable surface on the rocker arm.

2. The structure defined in claim 1 in which said means for moving said cam-engaging element in an arcuate path includes a control shaft journalled for rotation on the axis of rocking movement of said rocker arm, and a rigid link pivotally connected at one end to said cam-engaging element and operatively coupled at its opposite end to said control shaft for adjustment movements relative thereto and for common rocking movements with said rocker arm.

3. In an internal combustion engine of the type involving a cylinder block having a piston mounted for reciprocatory movements therein and a cylinder head cooperating with said block to define walls of a combustion chamber, a valve in said cylinder head, a cam rotatively mounted adjacent said cylinder head, and valve actuating connections between said cam and valve, said valve actuating connections comprising, a rocker arm having a portion engaging said valve, said rocker arm having a non-adjustable surface portion engaging said cam and an arcuate guide surface adjacent said cam-engaging surface, an adjustable cam-engaging element having a cam-engaging surface portion and arcuate guide means in sliding engagement with said arcuate guide surface on the rocker arm, a control shaft, means mounting said control shaft and said rocker arm for rotary and rocking movements respectively on a common axis, and linkage operatively coupled to said control shaft and connected to said cam-engaging element to shift the cam-engaging surface of said element angularly with respect to said non-adjustable surface and substantially about the axis of rotation of said cam responsive to rotation of said control shaft, said cam having a portion engaging both said surfaces and a second portion for engagement with only said non-adjustable surface on the rocker arm.

4. In an internal combustion engine of the type involving a cylinder block having a piston mounted for reciprocatory movements therein and a cylinder head cooperating with said block to define walls of a combustion chamber, a valve in said cylinder head, a bracket on said cylinder head, a cam shaft rotatively journalled in said bracket, a cam on said cam shaft, a tubular bearing element mounted in said bracket in spaced parallel relation to said cam shaft, a rocker arm journalled on said tubular bearing element and having a portion engaging said valve, said rocker arm having a flat non-adjustable surface portion engaging said cam and an arcuate guide surface adjacent said cam-engaging surface, an adjustable cam-engaging element having a flat cam-engaging surface portion and arcuate guide means in sliding engagement with said arcuate guide surface on the rocker arm, a control shaft journalled within said tubular bearing element co-axially with said rocker arm, and linkage operatively coupled to said control shaft and connected to said cam-engaging element to shift the cam-engaging surface of said cam-engaging element angularly with respect to said non-adjustable surface portion and substantially about the axis of rotation of said cam responsive to rotation of said control shaft, said cam having a portion engaging both said surfaces and a second portion for engagement with only said flat non-adjustable surface on the rocker arm.

5. The structure defined in claim 4 in which said linkage comprises a control arm pivotally connected at one end to said cam-engaging element, said control shaft having an eccentric bushing mounted thereon for common rotation therewith, the adjacent end of said control arm being journalled on said eccentric bushing for common rocking movements with said rocker arm.

6. In an internal combustion engine of the type involving a cylinder block having a piston mounted for reciprocatory movements therein and a cylinder head cooperating with said block to define walls of a combustion chamber, a pair of spaced intake and exhaust valves in said cylinder head, a bracket on said cylinder head, a cam shaft rotatively journalled in said bracket, a pair of axially spaced cams on said cam shaft, tubular bearing means in said bracket parallel to said cam shaft, a pair of rocker arms journalled on said tubular bearing means and each having a portion engaging a different one of said intake and exhaust valves, said rocker arms each defining a non-adjustable surface portion engaging a different one of said cams and an arcuate guide surface adjacent its respective cam-engaging surface portion, adjustable cam-engaging elements and each having a cam-engaging surface portion and arcuate guide means in sliding engagement with the arcuate guide surface on a different one of said rocker arms, control shaft means journalled within said tubular bearing means, a pair of control arms operatively coupled to said control shaft means and each connected to a different one of said cam-engaging elements to shift the cam-engaging surfaces thereof angularly with respect to the non-adjustable surface portions of their respective rocker arms and substantially about the axis of said cam shaft responsive to rotation of said control shaft means, and mechanism for imparting rotation to said control shaft means to impart simultaneous movement to said control arms and their respective cam-engaging elements.

7. In an internal combustion engine of the type involving a cylinder block having a piston mounted for reciprocatory movements therein and a cylinder head cooperating with said block to define walls of a combustion chamber, a pair of spaced intake and exhaust valves in said cylinder head, a bracket on said cylinder head, a cam shaft rotatively journalled in said bracket, a pair of axially spaced cams on said cam shaft, a pair of laterally spaced tubular bearing elements mounted in said brackets at opposite sides of said cam shaft and having their axes parallel to the axis of said cam shaft, a pair of rocker arms journalled at their intermediate portions one each on a different one of said bearing elements and having their outer end portions each engaging an adjacent one of said valves, the inner end portions of said rocker arms each defining a non-adjustable surface portion engaging a different one of said cams and an arcuate guide surface adjacent its respective cam-engaging surface, adjustable cam elements having cam-engaging surface portions and arcuate guide means in sliding engagement with the arcuate guide surfaces on said rocker arms, a pair of control shafts journalled each within a different one of said tubular bearing elements co-axially with adjacent ones of said rocker arms, a pair of control arms each operatively coupled to a different one of said control shafts and each connected to an adjacent one of said cam-engaging elements to shift the cam-engaging surface thereof angularly with respect to the non-adjustable surface portion of its respective rocker arm and substantially about the axis of said cam shaft responsive to rotation of its respective control shaft, and means operatively coupled to both of said control shafts for imparting simultaneous rotation thereto.

References Cited in the file of this patent

UNITED STATES PATENTS

| | | |
|---|---|---|
| 1,539,227 | Wood | May 26, 1925 |
| 1,885,796 | Boulet | Nov. 1, 1932 |